(12) United States Patent
Tsai (10) Patent No.: US 9,873,385 B2
(45) Date of Patent: Jan. 23, 2018

(54) BICYCLE MOUNTING ADAPTER (71) Applicant: KING SHEN CO., LTD., Taichung (TW)

(72) Inventor: David Tsai, Taichung (TW)

(73) Assignee: KING SHEN CO., LTD., Taichung (TW)

(*) Notice: Subject to any disclaimer, the term of this patent is extended or adjusted under 35 U.S.C. 154(b) by 0 days.

(21) Appl. No.: 15/131,709

(22) Filed: Apr. 18, 2016

(65) Prior Publication Data

US 2016/0229351 A1 Aug. 11, 2016

Related U.S. Application Data (63) Continuation-in-part of application No. 14/095,305, filed on Dec. 3, 2013, now abandoned.

(51) Int. Cl.
*B60R 9/00* (2006.01)
*B60R 9/052* (2006.01)
*B60R 9/10* (2006.01)
*B60R 9/048* (2006.01)

(52) U.S. Cl.
CPC ............... *B60R 9/10* (2013.01); *B60R 9/048* (2013.01)

(58) Field of Classification Search
CPC .............. B60R 9/048; B60R 9/10; B60R 9/12
USPC ................................ 224/324, 315, 322, 924
See application file for complete search history.

(56) References Cited

U.S. PATENT DOCUMENTS

| 4,964,287 | A | * | 10/1990 | Gaul | B62H 5/001 224/924 |
| --- | --- | --- | --- | --- | --- |
| 5,291,763 | A | | 3/1994 | Cuisinot | |
| 5,362,173 | A | * | 11/1994 | Ng | B60R 9/048 224/315 |
| 5,598,959 | A | * | 2/1997 | Lorensen | B60R 9/045 224/315 |
| 5,673,925 | A | | 10/1997 | Stewart | |
| 5,813,258 | A | * | 9/1998 | Cova | B62K 25/02 301/124.2 |
| 6,036,069 | A | * | 3/2000 | Sayegh | B60R 9/048 224/324 |
| 6,167,735 | B1 | * | 1/2001 | Brown | B60R 9/048 211/5 |
| 6,382,480 | B1 | | 5/2002 | Egly | |
| 6,494,351 | B1 | | 12/2002 | Dean | |

(Continued)

*Primary Examiner* — Adam Waggenspack
*Assistant Examiner* — Lester L Vanterpool
(74) *Attorney, Agent, or Firm* — Muncy, Geissler, Olds & Lowe, P.C.

(57) ABSTRACT

A bicycle mounting adapter for installing a bicycle to a mounting includes a frame and two holding tubes. The frame has a transverse member and two lateral members. The two second segments are separated by a distance greater than a distance between the two first segments. The first segment has a fixing hole. The second segment has a notch. The holding tube has an embedded segment, a propping segment, and a shoulder located between the embedded segment and the propping segment. The embedded segments are inserted into the respective fixing holes and thus fix the holding tubes to the lateral members. The two holding tubes have major axes thereof aligned with each other. The propping segments each have a terminal surface defined as a pressing surface. The pressing surfaces of the holding tubes work with a quick-release assembly to hold a fork of the bicycle.

8 Claims, 8 Drawing Sheets

(56) References Cited

U.S. PATENT DOCUMENTS

| | | | |
|---|---|---|---|
| 6,758,380 B1 * | 7/2004 | Kolda | B60R 9/048 224/315 |
| 7,726,529 B2 | 6/2010 | Foley | |
| 7,757,914 B2 * | 7/2010 | Book | B60R 9/048 224/324 |
| D653,193 S * | 1/2012 | Chisholm | D12/408 |
| D689,012 S * | 9/2013 | Kuschmeader | D12/408 |
| 2002/0053581 A1 * | 5/2002 | Peschmann | B60R 9/10 224/319 |
| 2007/0210127 A1 | 9/2007 | Book et al. | |
| 2008/0061198 A1 * | 3/2008 | Noyes | B60R 9/048 248/205.1 |
| 2013/0062379 A1 | 3/2013 | Sautter | |

\* cited by examiner

BICYCLE MOUNTING ADAPTER

CROSS-REFERENCE TO RELATED APPLICATION

This patent application is a continuation-in-part of U.S. patent application Ser. No. 14/095,305 filed Dec. 3, 2013 entitled "APPARATUS FOR HOLDING A FORK OF A MOUNTAIN BICYCLE", the entire disclosure of which is incorporated herein by reference.

BACKGROUND OF THE INVENTION

1. Technical Field

The present invention relates to transportation of vehicles, and more particularly to a bicycle mounting adapter for fitting a bicycle on a mounting.

2. Description of Related Art

Forks in bicycles may be designed to work with a conventional wheel axle or may be designed to work with a quick-release assembly. Since a quick-release assembly is usually diametrically greater than a conventional wheel axle, forks designed for the different purposes usually have different specifications.

Many modern cars are atop equipped with a bicycle holder, which has a transverse rod for connection and other associated components. At each of the two ends of the transverse rod there is an externally threaded segment for mating a nut, on which an attachment is installed to hold a bicycle at its fork for convenient vehicular transportation of the bicycle to a destination.

An existing attachment, as disclosed in U.S. Pat. No. 6,036,069, has a tubular cross member and two side members. The cross member contains therein a fastening means, which is partially exposed outside the cross member for holding a bicycle's fork. Each of the side members is vertically connected to one end of the cross member, with their free ends forming a U-shaped notch for receiving the threaded segments of the transverse rod as described previously. However, since the side members and the cross member are soldered together, the joints therebetween tend to rust, be corroded or break, leading to not only poor appearance but also structural defects. Besides, assembling of the bicycle holder requires repeated installation and tightening of nuts, and is very awkward.

U.S. Pat. No. 7,757,914 B2 also discloses amounting for a bicycle's fork to be attached thereto directly. Such a mounting incorporates therein a quick-release assembly, so that a bicycle's fork can conveniently sit in the mounting. Nevertheless, such a mounting with integrated quick-release assembly is available in a single specification that is not compatible to bicycles using a conventional wheel axle. On the contrary, attempts to fit a bicycle fork compatible to a quick-release assembly on a transverse rod (indicated by the numeral 12) as one described in U.S. Pat. No. 6,036,069 would fail. Hence, there is a need for a solution that adapts a mounting to bicycle forks of different specifications.

SUMMARY OF THE INVENTION

The primary objective of the present invention is to provide a bicycle mounting adapter that adapts an existing mounting to bicycle forks of different specifications, and allows easy mount/dismount of a bicycle on/from the mounting.

Therefore, according to the present invention, a bicycle mounting adapter for being attached to a rod of a mounting installed on a car roof in order to provide a fork of a bicycle with an installation environment that is dimensionally different from the mounting includes a frame and two holding tubes. The frame has a transverse member and two lateral members. The two second segments are separated by a distance greater than a distance between the two first segments. The first segment has a fixing hole. The second segment has a notch. The holding tube has an embedded segment, a propping segment, and a shoulder located between the embedded segment and the propping segment. The embedded segments are inserted into the respective fixing holes and thus fix the holding tubes to the lateral members. The two holding tubes have major axes thereof aligned with each other. The propping segments each have a terminal surface defined as a pressing surface. The pressing surfaces of the holding tubes work with a quick-release assembly to hold a fork of the bicycle.

Thereby, an existing mounting is adapted to bicycle forks of different specifications, and easy mount/dismount of a bicycle on/from the mounting is achieved.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings.

As shown in FIG. 1 through FIG. 6, in a preferred embodiment of the present invention, a bicycle mounting adapter 10 is configured to be installed on a rod 82 of a mounting 81 provided on a car roof, for fitting a fork 91 of a bicycle to the mounting 81. The bicycle mounting adapter 10 primarily comprises a frame 11 and two holding tubes 21.

The frame 11 has a transverse member 12 and two lateral members 14. The two lateral member 14 extends from two ends of the transverse member 12 toward the same direction while keeping parallel to each other to form a pair of first segments 141. The lateral members 14 than expand outward to form a pair of inclined segments 144, before once again extending a pair of parallel second segments 147. The two second segments 147 are separated by a distance greater than a distance between the two first segments 141. Each of the first segments 141 has a fixing hole 142, and each of the second segments 147 has a notch 148. In the present embodiment, the transverse member 12 and the two lateral members 14 are integratedly formed as a unity by folding a lengthwise sheet. The frame 11 is mounted on the mounting 81 by means of the notches 148 of the two second segments 147.

The two holding tubes 21 each have an embedded segment 22, a propping segment 24, and a shoulder 23 located between the embedded segment 22 and the propping segment 24. The embedded segments 22 of the two holding tubes 21 are inserted into the respective fixing holes 142 and thus fix the holding tubes 21 to the lateral members 14. The two holding tubes 21 have their major axes aligned with each other. The propping segments 24 each have a terminal surface defined as a pressing surface 241. The pressing surfaces 241 are configured to work with a quick-release assembly 31 to hold the bicycle fork 91. In the present embodiment, the holding tube 21 has a circular shoulder 23, whose outer diameter is greater than an outer diameter of the embedded segment 22. Thereby, when the embedded segments 22 of the two holding tubes 21 are received in the respective fixing holes 142, the shoulders 23 abut against the lateral members 14 of the frame 11 for positioning. Additionally, in the present embodiment, the embedded segment 22 of the holding tube 21 is provided with raised veins 221 at its surface, so as to enhance the friction between itself and a wall defining the fixing hole 142 for even better securing effects.

Figure 1:
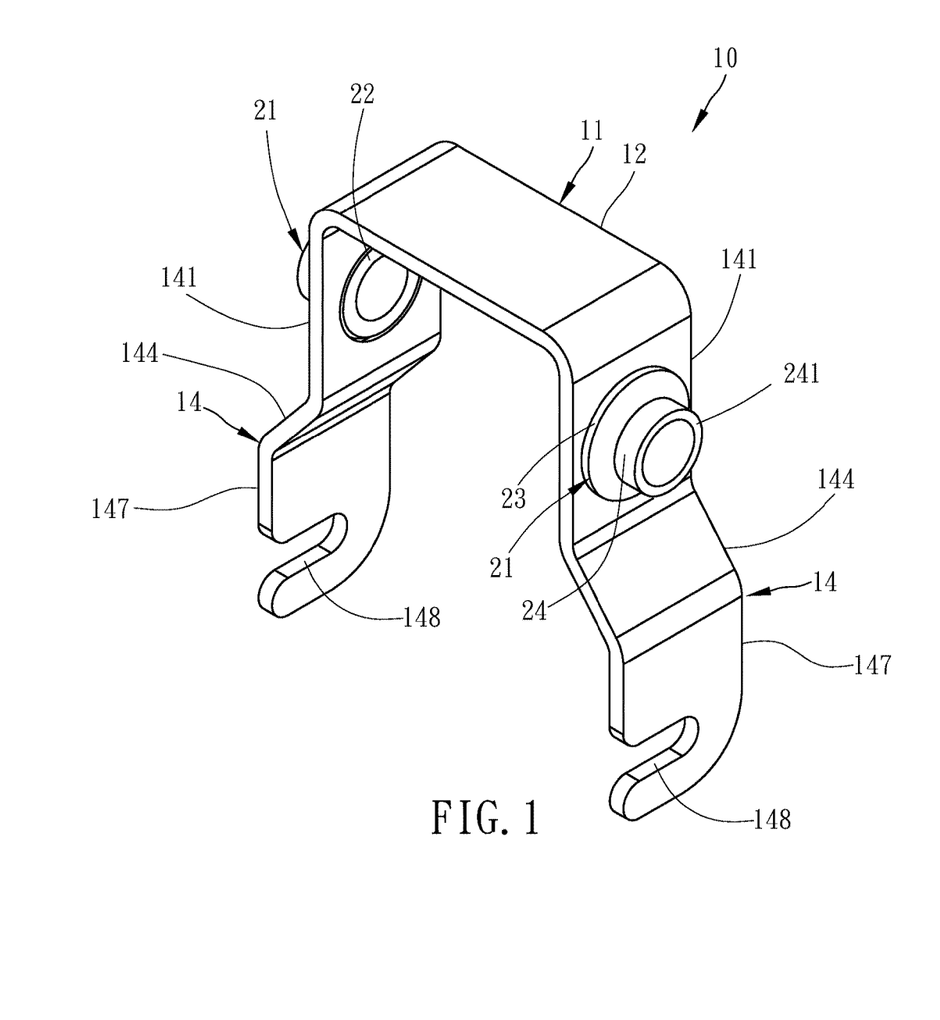
FIG. 1 is a perspective view of a first preferred embodiment of the present invention.
Figure 2:
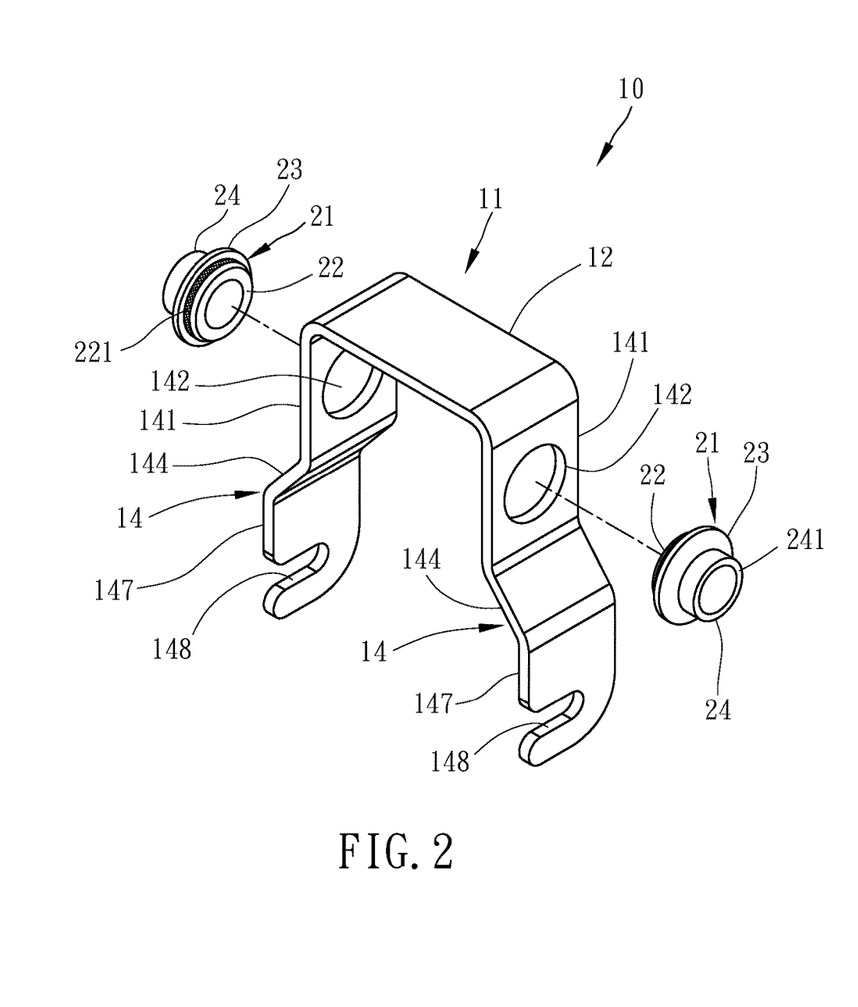
FIG. 2 is an exploded view of the first preferred embodiment of the present invention.
Figure 3:
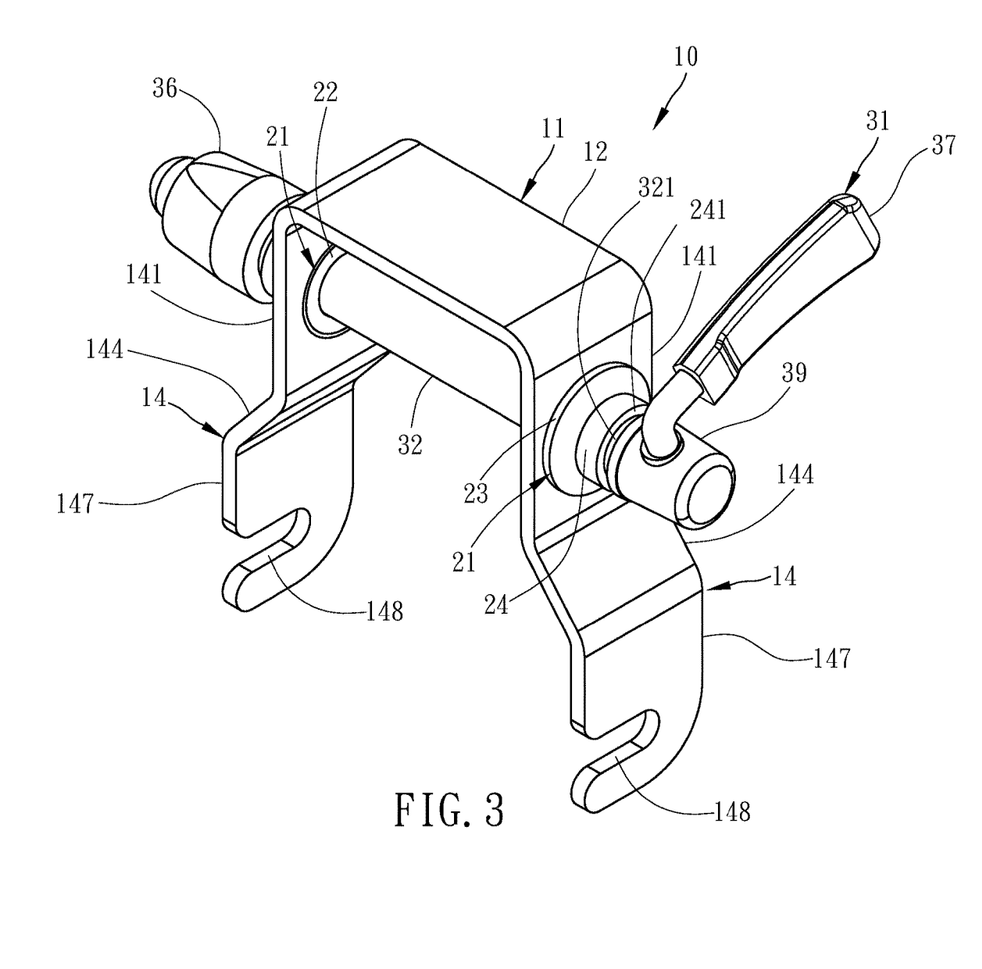
FIG. 3 is a perspective view of the first preferred embodiment of the present invention incorporating a quick-release assembly.
Figure 4:
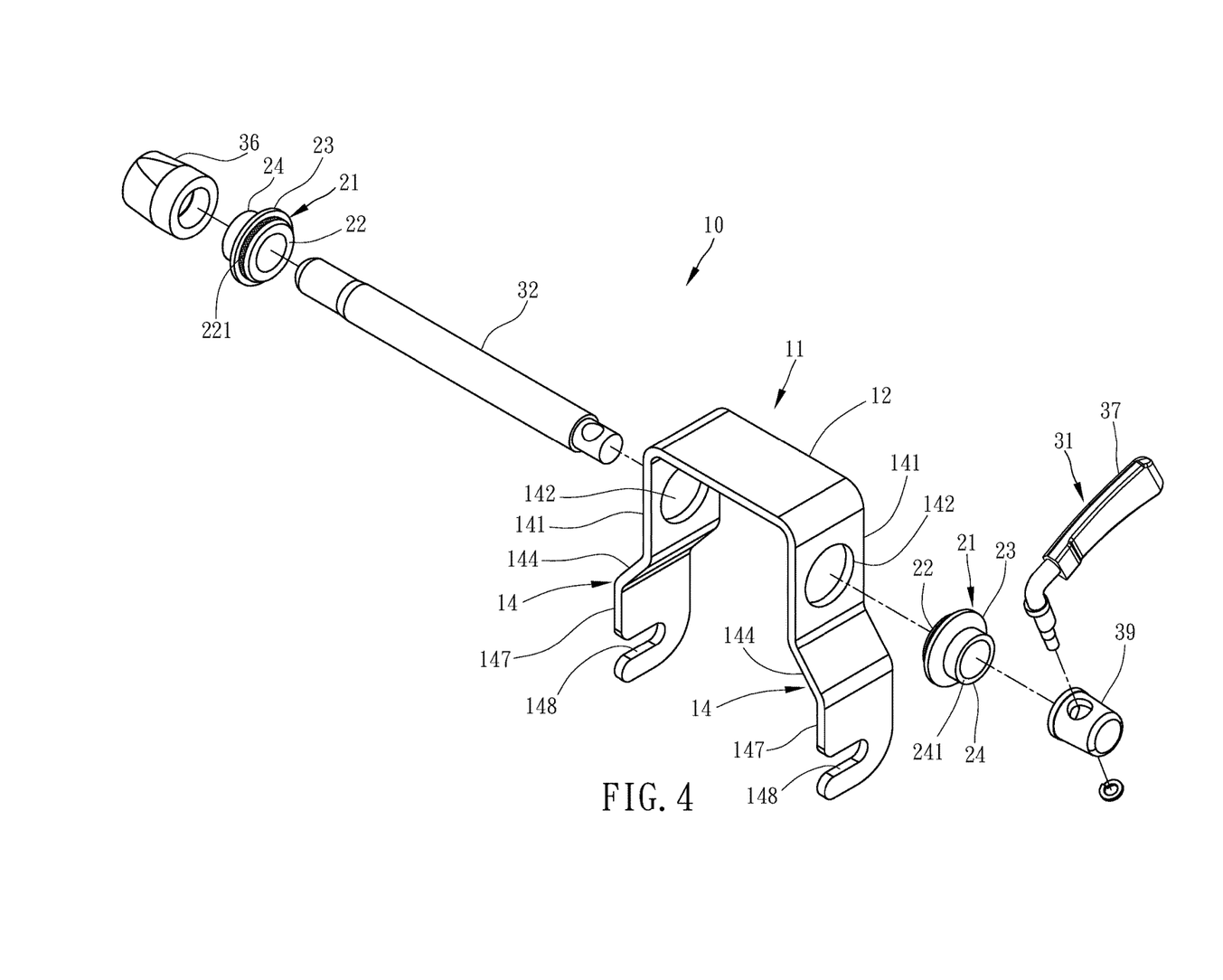
FIG. 4 is an exploded view of the device of FIG. 3.
Figure 5:
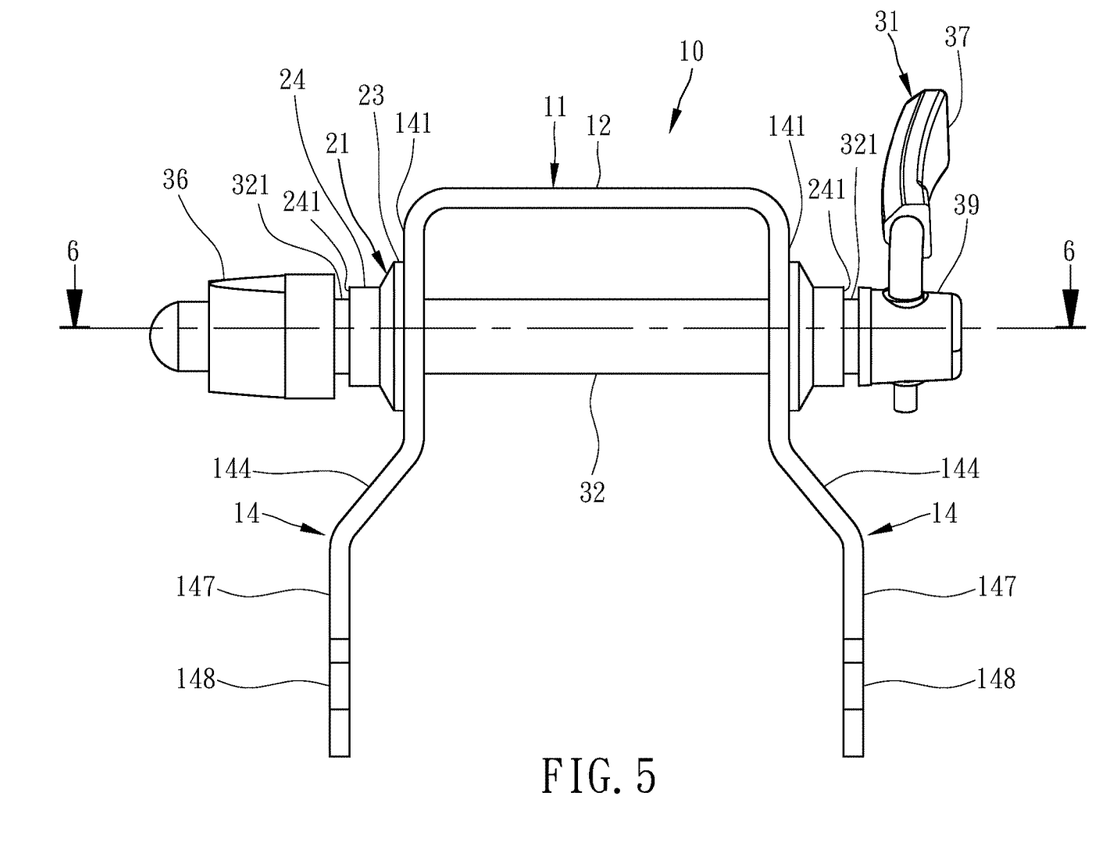
FIG. 5 is a front view of the device of FIG. 3.
Figure 6:
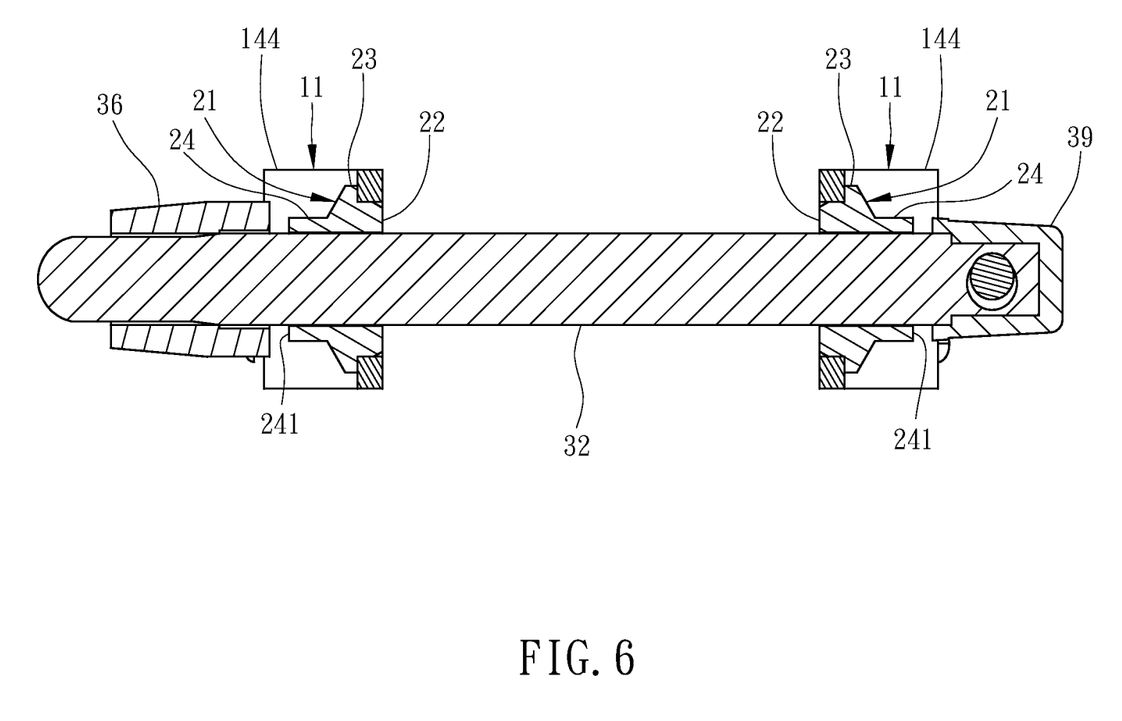
FIG. 6 is a cross-sectional view taken along Line 6-6 of FIG. 5.

The quick-release assembly 31 has an axial shaft 32, whose two opposite ends are provided with an end block 36 and an adjusting lever 37, respectively. A moving block 39 is movably mounted around the axial shaft 32 and is configured to be driven by the adjusting lever 37 to shift along the axial shaft 32.

Therein, the quick-release assembly 31 is engaged with the two holding tubes 21. The axial shaft 32 passes through the two holding tubes 21 and gets its two ends exposed outside the propping segments 24 of the two holding tubes 21. The axial shaft 32 has two sections exposed outside the propping segments 24 of the two holding tubes 21 defined as two receiving portions 321. The two receiving portions 321 are located between the pressing surface 241 of one of the holding tubes 21 and the moving block 39, and between the pressing surface 241 of the other holding tube 21 and the end block 36, respectively. The two receiving portions 321 are configured to receive the bicycle fork 91 (hereinafter referred to as the fork for simplicity). When the fork 91 is such received, a user may operate the adjusting lever 37 to move the axial shaft 32, so that the end block 36 and the moving block 39 come close to each other, thereby holding the fork 91 securely between the pressing surfaces 241 of the two holding tubes 21.

It is to be noted that, in the present embodiment, a face-to-face distance between the two second segments 147 is equal to a distance between the terminal surfaces of the two propping segments 24. With this configuration, the frame 11 is combined with the mounting 81 at the notches 148 of the two second segments 147, and the mounting 81 is intended to allow the fork 91 to sit thereon. This means that for being able to be installed on the mounting 81, the face-to-face distance between the two second segments 147 has to be equal to the interval between two arms of the fork 91. Furthermore, since the face-to-face distance between the two second segments 147 is equal to the distance between the terminal surfaces of the two propping segments 24, the fork 91 can be instead installed the two receiving portions 321 with its two arms next to the terminal surfaces of the two propping segments 24.

With the configuration described above, the first embodiment of the present invention works as follows.

Referring to FIG. 7 and FIG. 1 through FIG. 6 as well, for installing the disclosed device, the frame 11 is first fixed to an external mounting 81 by having the mounting 81 received in the notches 148 on the two second segments 147 of the frame 11. The adjusting lever 37 at this time should at its released position where the moving block 39 is free to move, and the two receiving portions 321 of the axial shaft 32 are exposed. Then, after a fork 91 has its two arms placed on the two receiving portions 321, the adjusting lever 37 is moved to its pressed position. The axial shaft 32 consequently moves with respect to the moving block 39 and makes the moving block 39 and the end block 36 press against the two holding tubes 21, so that he moving block 39, the end block 36, and the pressing surfaces 241 of the two holding tubes 21 jointly hold the fork 91 securely.

Figure 7:
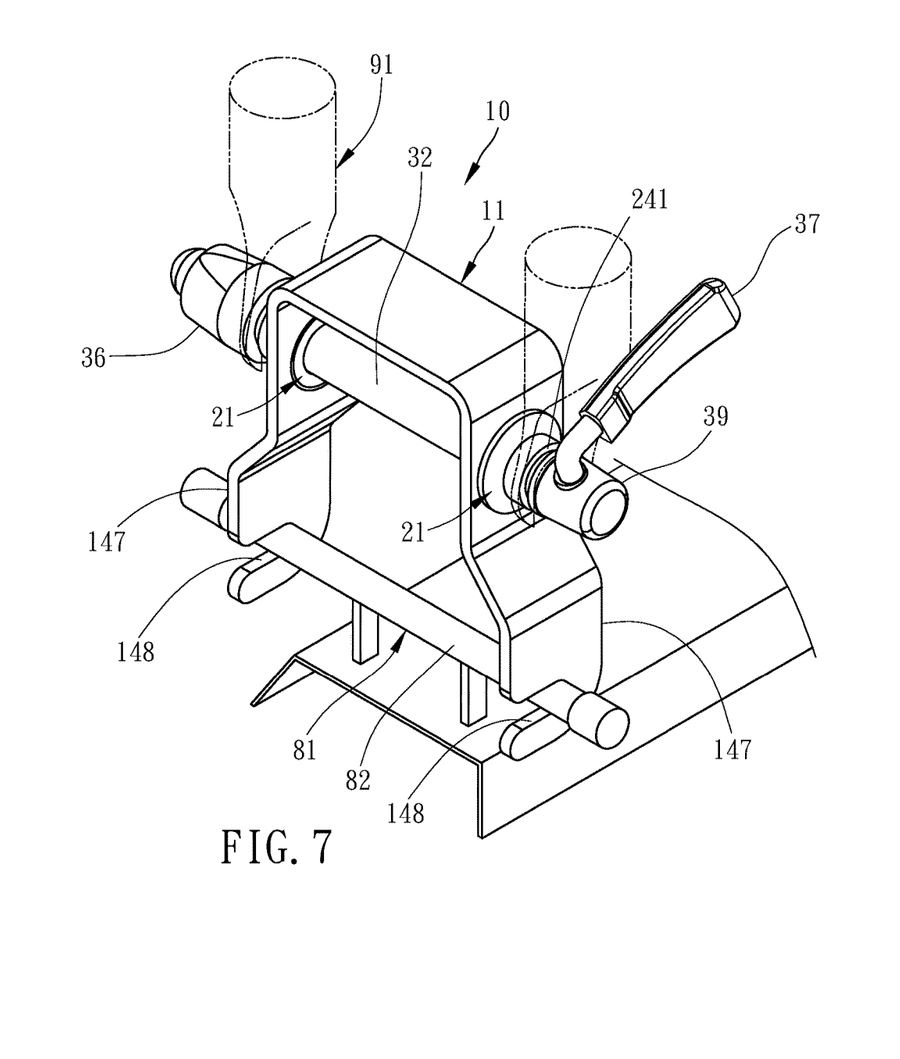
FIG. 7 is an applied view of the device of FIG. 3.

An alternative way for installing the disclosed device is to first combine the adapter to the fork 91, and then mount the bicycle together with the adapter onto the mounting 81. The operation involves first securing the fork 91 by the moving block 39, the end block 36, and the pressing surfaces 241 of the two holding tubes 21 as described previously, and installing the bicycle thither with the adapter to the mounting 81 by means of the notches 148 on the second segments 147 of the frame 11. By doing so, the fork 91 can be also secured.

It is clear from the above description that it is possible to have the disclosed adapter combined with the mounting 81 before the fork 91 is settled on the two receiving portions 321. In the event that the fork 91 and the mounting 81 do not match in terms of dimensions, the axial shaft 32 of the present invention can be adjusted to meet the dimensions of the fork 91. As shown in FIG. 7, the rod 82 has a diameter smaller than that of the axial shaft 32, so the benefit related to dimensional adaption is proven. In this manner, the present invention adapts an existing mounting 81 in terms of dimensions to bicycle fork 91 of different specifications by simply providing different axial shafts 32. The present invention also allows easy mount/dismount of a bicycle at its fork on/from a mounting, contributing to convenient use.

Figure 8:
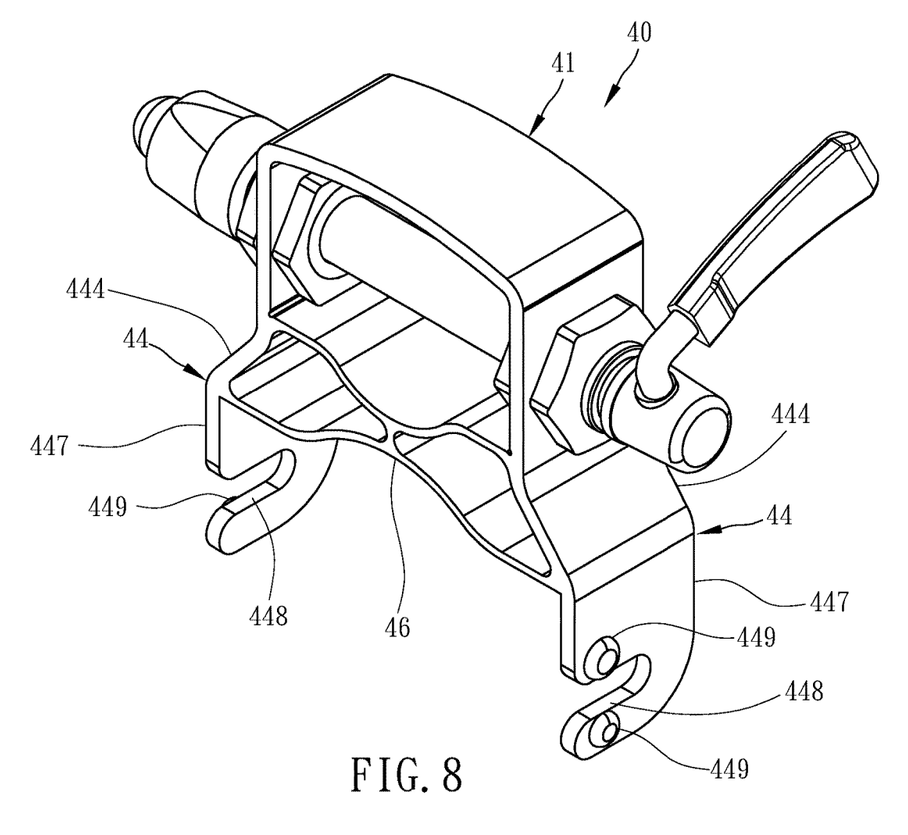
FIG. 8 is a perspective view of a second preferred embodiment of the present invention.

Referring to FIG. 8, in a second preferred embodiment of the present invention, a bicycle mounting adapter 40 is similar to its counterparts as described in the first embodiment with the following difference.

Plural studs 449 are provided on each of the two second segments 447 at its surface not facing the other second segment 447. The studs 449 are close to the notch 448. When the bicycle mounting adapter 40 has the notches 448 engaged with the rod 82 (shown in FIG. 7) of the mounting 81, the studs 449 interact with an interfereable portion (not shown) provided on the mounting 81, in order to provide additional interference that further secures the combination.

In the second embodiment, there is further a support 46 with its two ends fixed to the two lateral members 44, in order to provide additional reinforcement to the two lateral members 44. The support 46 may be fixed to the inclined segments 444 of the two lateral members 44. This also allows the support 46 to reinforce the two lateral members 44 and structurally enhance the frame 41.

The remaining parts and effects of the second embodiment are similar to those of the first embodiment, and detailed description is thus eliminated.

What is claimed is:

1. A bicycle mounting adapter for being attached to a rod of a mounting installed on a car roof in order to provide a fork of a bicycle with an installation environment that is dimensionally different from the mounting, the bicycle mounting adapter comprising:

a frame, having a transverse member and two lateral members; the two lateral member extending codirectionally from two ends of the transverse member while keeping parallel to each other to form a pair of first segments, the lateral members than expanding outward to form a pair of inclined segments, before once again extending a pair of parallel second segments, the two second segments being separated by a distance greater than a distance between the two first segments, each of the first segments having a fixing hole, and each of the second segments having a notch; and two holding tubes, each having an embedded segment, a propping segment, and a circular shoulder located between the embedded segment and the propping segment; the embedded segments of the two holding tubes being inserted into the respective fixing holes and thus fixing the holding tubes to the lateral members, the two holding tubes having major axes thereof aligned with each other, and the propping segments each having a terminal surface defined as a pressing surface;

wherein the holding tube has the circular shoulder, whose outer diameter is greater than an outer diameter of the embedded segment;

wherein each of the two lateral members has an outer surface, and the circular shoulders are abutted against the outer surfaces of the two lateral members, respectively;

wherein the transverse member and the lateral members are monolithically formed by a bent piece in a way that the lateral members are perpendicular to the transverse member;

wherein the frame is formed by a sheet in a bended form; and wherein the two lateral members extend downwardly from the transverse member and the fixing hole of each of the first segments has a top portion lower than a bottom surface of the transverse member;

whereby, the pressing surfaces of the holding tubes work with a quick-release assembly to hold the fork of the bicycle.

2. The bicycle mounting adapter of claim 1, wherein a plurality of studs are provided on each of the two second segments at a surface thereof not facing the other second segment, and the studs are close to the notch, so that when the bicycle mounting adapter has the notches engaged with the rod of the mounting, the studs act on the mounting.

3. The bicycle mounting adapter of claim 1, wherein a distance between surfaces of the two second segments facing each other is equal to a distance between the terminal surfaces of the two propping segments.

4. The bicycle mounting adapter of claim 1, wherein the transverse member and the two lateral members are integratedly formed as a unity by folding a lengthwise sheet.

5. The bicycle mounting adapter of claim 1, further comprising a support, which has two ends thereof fixed to the two lateral members, in order to provide reinforcement to the two lateral members.

6. The bicycle mounting adapter of claim 5, wherein the support is fixed to the inclined segments of the two lateral members.

7. The bicycle mounting adapter of claim 1, wherein the embedded segment of the holding tube is provided with raised veins at its surface, so as to enhance the friction between itself and a wall defining the fixing hole.

8. The bicycle mounting adapter of claim 1, wherein the quick-release assembly has an axial shaft, whose two opposite ends are provided with an end block and an adjusting lever, respectively, and has a moving block being movably mounted around the axial shaft and configured to be driven by the adjusting lever to shift along the axial shaft, wherein the quick-release assembly is engaged with the two holding tubes, and the axial shaft passes through the two holding tubes and gets two ends thereof exposed outside the propping segments of the two holding tubes, the axial shaft having two sections exposed outside the propping segments of the two holding tubes defined as two receiving portions, the two receiving portions being located between the pressing surface of one of the holding tubes and the moving block, and between the pressing surface of the other holding tube and the end block, respectively.

* * * * *